(12) United States Patent
Vanzini et al.

(10) Patent No.: US 8,916,648 B2
(45) Date of Patent: Dec. 23, 2014

(54) POLYMER FILAMENT

(75) Inventors: Roberto Vanzini, Ferrara (IT); Roberto De Palo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/878,101

(22) PCT Filed: Oct. 11, 2011

(86) PCT No.: PCT/EP2011/067666
§ 371 (c)(1),
(2), (4) Date: Apr. 5, 2013

(87) PCT Pub. No.: WO2012/049132
PCT Pub. Date: Apr. 19, 2012

(65) Prior Publication Data
US 2013/0217831 A1 Aug. 22, 2013

Related U.S. Application Data

(60) Provisional application No. 61/405,682, filed on Oct. 22, 2010.

(30) Foreign Application Priority Data

Oct. 15, 2010 (EP) .................................. 10187734

(51) Int. Cl.
*C08L 23/12* (2006.01)
*C08L 23/20* (2006.01)
*C08L 47/00* (2006.01)
*D01D 5/42* (2006.01)
*D01F 6/46* (2006.01)

(52) U.S. Cl.
CPC ................. *C08L 47/00* (2013.01); *C08L 23/12* (2013.01); *C08L 23/20* (2013.01); *D01D 5/426* (2013.01); *D01F 6/46* (2013.01); *C08L 2205/16* (2013.01)
USPC .......................................... 525/191; 525/240

(58) Field of Classification Search
CPC ..... C08L 23/12; C08L 23/20; C08L 2203/12; D01F 6/46
USPC ................................ 525/191, 240
See application file for complete search history.

(56) References Cited

U.S. PATENT DOCUMENTS

| 5,140,073 | A | 8/1992 | Rolando et al. |
| 5,622,765 | A | 4/1997 | Clementini et al. |
| 2003/0236352 | A1 | 12/2003 | Winowiecki |
| 2004/0001951 | A1 | 1/2004 | Slootweg et al. |
| 2004/0186214 | A1 | 9/2004 | Li et al. |
| 2007/0055004 | A1 | 3/2007 | Malacarne et al. |
| 2010/0304068 | A1 | 12/2010 | Ferrara et al. |
| 2011/0238027 | A1 | 9/2011 | Di Pietro et al. |
| 2013/0102735 | A1* | 4/2013 | Minowa et al. ............... 525/240 |

FOREIGN PATENT DOCUMENTS

EP 0337662 10/1989

OTHER PUBLICATIONS

Lyondellbasell Trade sheet for Polybutene-1, Grade PB 0110M, copyright 2007.*
Lyondellbasell Trade sheet for Polybutene-1, Grade PB 8640M, copyright 2007.*
"Mechanical Behaviour"; "Chapter 6" In: I .D. Rubin: "Poly(1-butene)—Its Preparation and Properties", Dec. 31, 1968, XP002666034, pp. 79-86.
"Butene Polymers" A.M. Chatterjee-In: H.F. N.M. Bikales, C.G. Overberger & G. Menges: Encyclopedia of Polymer Science & Engineering Dec. 31, 1985, XP00266025, pp. 590-605.
"Standard Thermoplaste" "15.2"—In: H.G. Elias—"makromolekule", Dec. 31, 1992—Hutig und Wepf, Heidelberg, XP002666024, ISBN: 3-85739-102-2—vol. 2 pp. 443-447.
"Lyondellbasell Polybutene-1 DP 0401M" Lyndellbasell website—Nov. 7, 2007—XP002666103—Retrieved from https://polymers.lyondellbasell.com/portal/binary/com.vignette.vps.basell.productgrade.ProductGradeFileDisplay?id=bf6a11bf33159010VgnVCM100000646f3c14RCRD&type=iso (retrieved Dec. 20, 2011) the whole document.
"Lyondellbasell Polybutene-1 DP 8220M" Lyndellbasell website—Apr. 29, 2005—XP002666104—Retrieved from https://polymers.lyondellbasell.com/portal/binary/com.vignette.vps.basell.productgrade.ProductGradeFileDisplay?id=6e0684b40c337010VgnVCM100000646f3c14RCRD&type=iso (retrieved Dec. 20, 2011) the whole document.
PCT International Search Report & Written Opinion mailed Dec. 30, 2011, for PCT/EP2011/067666.

* cited by examiner

*Primary Examiner* — Nathan M Nutter

(57) ABSTRACT

A polymer filament comprising a polyolefin composition which comprises (percentages by weight): A) 5%-95% of a propylene homopolymer; and B) 5-95% of a butene-1 homopolymer or copolymer having a flexural modulus of 80 MPa or higher.

5 Claims, No Drawings

POLYMER FILAMENT

This application is the U.S. National Phase of PCT International Application PCT/EP2011/067666, filed Oct. 11, 2011, claiming priority of European Patent Application No. 10187734.8, filed Oct. 15, 2010 and the benefit under 35 U.S.C. 119(e) of U.S. Provisional Application No. 61/405,682, filed Oct. 22, 2010, the contents of which are incorporated herein by reference in their entirety.

The present invention concerns a polymer filament.

The term "filament" is used in the definition of the present invention to make a distinction with respect to the fibers normally used for textile and carpeting applications. In fact it is known that strands with heavy denier, often called "filaments", are required for specific applications like civil engineering, packaging and artificial turf structures.

Examples of polymer filaments are described in EP1378592.

Thus the filaments according to the invention are preferably characterized by a titre of at least 20 dTex.

It has now been found that by using, for the preparation of said filaments, a blend of a propylene homopolymer with a butene-1 polymer, an unusual and valuable set of properties is obtained. In particular, both the tensile properties, like stress and elongation at break, and the creep resistance, are remarkably enhanced with respect to a filament made of polypropylene alone. The creep resistance, as shown in the examples, is the resistance to deformation under a tension load.

Thus the present invention provides a polymer filament comprising a polyolefin composition which comprises (percentages by weight):
A) 5%-95%, preferably 10%-95%, in particular 15%-90% of a propylene homopolymer; and
B) 5%-95%, preferably 5%-90%, in particular 10%-85%, of a butene-1 homopolymer or copolymer having a flexural modulus of 80 MPa or higher, in particular of 250 MPa or higher.

The filaments according to the present invention are also typically characterized by a rounded (circular, oval or even more complex, like multilobal) cross-section, or by an angular, like rectangular, cross-section.

The filaments having rounded cross-section are also called "monofilaments" while those having angular and in particular rectangular cross-section are also called "tapes". Thus the definition of "filament" according to the present invention comprises the said monofilaments and tapes.

Preferably the tapes have a thickness from 0.03 to 1 mm and width from 2 to 20 mm.

As previously said, the filaments of the present invention are preferably characterized by a titre of at least 20 dTex Particularly preferred titre values for the filaments of the present invention are of at least 50 dTex, especially of at least 100 or 200, in particular of at least 500 dTex, the upper limit being preferably of 1000 dTex for monofilaments and of 25000 dTex for tapes.

The filament according to the present invention is preferably stretched by drawing. Particularly preferred are draw ratios from 1.5 to 10, in particular from 3 to 10.

Additional preferred features for the propylene homopolymer (A) are:
MFR measured according to ISO 1133 at 230° C., 2.16 kg, of 0.5-10 g/10 min.;
melting temperature equal to or higher than 155° C., in particular from 155° C. to 165° C., measured with differential scanning calorimetry (DSC);
a polymer fraction insoluble in xylene at room temperature (about 25° C.) equal to or higher than 90% by weight, in particular higher than 95% by weight.

The propylene homopolymer (A) can be prepared by using a Ziegler-Natta catalyst or a metallocene-based catalyst system in the polymerization process.

The said catalysts and the polymerization processes are known in the art.

Conventional molecular weight regulators known in the art, such as chain transfer agents (e.g. hydrogen or $ZnEt_2$), may be used.

Preferred examples of Ziegler-Natta catalysts are the supported catalyst systems comprising a trialkylaluminium compound, optionally an electron donor, and a solid catalyst component comprising a halide or halogen-alcoholate of Ti and optionally an electron-donor compound supported on anhydrous magnesium chloride. Catalysts having the above-mentioned characteristics and polymerization processes employing such catalysts are well known in the patent literature; particularly advantageous are the catalysts and polymerization processes described in U.S. Pat. No. 4,399,054 and EP-A-45 977. Other examples can be found in U.S. Pat. No. 4,472,524.

Preferred examples of metallocene-based catalyst systems are disclosed in US2006/0020096 and WO98/040419.

The polymerization conditions in general do not need to be different from those used with Ziegler-Natta catalysts.

The homo- or copolymers B) of butene-1 are well known in the art, particularly for their good properties in terms of pressure resistance and creep resistance.

Suited homoplymers B) of butene-1 are linear, semicrystalline, higly isotactic homopolymers (having in particular an isotacticity from 96 to 99%, measured both as mmmm pentads/total pentads using NMR, and as quantity by weight of matter soluble in xylene at 0° C.).

Suitable copolymers B) of butene-1 are the copolymers preferably containing up to 20% by weight, in particular up to 15% by weight of comonomer(s). The comonomers in copolymer B) are in particular olefinic comonomers, preferably selected from ethylene, propylene and $CH_2=CHR$ α-olefins where R is a $C_3$-$C_6$ alkyl radical. Examples of the said $CH_2=CHR$ α-olefins are 4-methyl-1-pentene, octene-1. Most preferred comonomers in the copolymer B) are ethylene and propylene.

All these homo- or copolymers of butene-1 can be obtained with polymerization processes and catalysts well known in the art, like low-pressure Ziegler-Natta polymerization of butene-1, for example by polymerizing butene-1 (and any comonomers) with catalysts based on $TiCl_3$, or supported catalysts systems of the same kind as described above for the preparation of the propylene homoplymer A).

Other preferred features of the homo- or copolymers B) are:
a flexural modulus from 80 to 600 MPa, in particular form 250 to 600 MPa;
MFR measured according to ISO 1133 at 190° C., 2.16 kg, of 0.1-20 g/10 min., in particular 0.1-10 g/10 min.;
a melting point Tm(II) of crystalline form 2 (the first to form, being favoured kinetically) from 81 to 115° C., measured by DSC according to ISO 11357 Part 3.

The polyolefin compositions used for preparing the filament of the present invention are obtainable by melting and mixing the components, and the mixing is effected in a mixing apparatus at temperatures generally of from 180 to 310° C., preferably from 190 to 280° C., more preferably from 200 to 250° C.

Any known apparatus and technology can be used for this purpose.

Useful melt-mixing apparatus in this context are in particular extruders or kneaders, and particular preference is given to twin-screw extruders. It is also possible to premix the components at room temperature in a mixing apparatus.

During the preparation of the polyolefin compositions, besides the main components A) and B) and any other optional polymer components, it is possible to introduce additives commonly employed in the art, such as stabilizing agents (against heat, light, U.V.), plasticizers, antiacids, antistatic and water repellant agents, pigments.

The polyolefin filament of the invention can be prepared by means of processes and apparatuses well known in the relevant art.

In general terms, the process for preparing polyolefin filaments according to the invention comprises the following steps:
(a) melting the propylene homoplymer A), the butene-1 homopolymer or copolymer B) and any other polyolefin components;
(b) spinning the filaments or extruding a precursor film or tape;
(c) optionally drawing the filaments or the precursor film or tape and/or cutting the precursor film or tape and optionally drawing the so obtained filaments, when no drawing is previously carried out;
(d) optionally finishing the filaments obtained from step (b) or by cutting the precursor film or tape in step (c).

The melting step (a) and the spinning or extrusion step (b) are generally carried out continuously in sequence by using mono- or preferably twin-screw extruders, equipped with a suited spinning or extrusion head. Thus also the previously described melt-mixing step can be carried out in the same spinning or extrusion apparatus used in step (b).

The spinning heads comprise a plurality of holes with the same shape as the transversal section of the filament (monofilament or tape).

The film extrusion heads are generally flat or annular dies commonly used for the film preparation.

When a precursor film or tape is obtained in step (b), it is then processed in step (c) by cutting it into tapes having the desired size. When the drawing treatment is carried out on the precursor film or tape, it is consequently no longer required on the final filament.

Examples of finishing treatments can be fibrillation and crimping.

Fibrillation is generally carried out on tapes.

Typically the melting step (a) and the spinning or extrusion step (b) are carried out at the same temperatures as previously defined for the melt-mixing step, namely of from 180 to 310° C., preferably from 190 to 280° C., more preferably from 200 to 250° C.

Typical spinning conditions are:
value of output per hole from 5 to 15 g/min;
pressure in the extruder from 10 to 40 bar;
temperature in the extruder head from 200 to 300° C.;
take-up speed from 200 to 1000 m/min.
Typical film extrusion conditions are:
output value from 50 to 1000 kg/hour (on industrial plants);
pressure in the extruder from 100 to 200 bar.

The filament or the precursor film obtained in step (b) are generally cooled by using for instance one or more chill rolls or by immersion in water at a temperature from 5 to 25° C.

To carry out the drawing treatment, the filament (monofilament or tape) or the precursor tape are previously heated at a temperature from 40 to 120-140° C. Heating can be achieved by using for example heated rolls or by irradiation or other known means.

Drawing can be achieved by delivering the filament or the precursor tape through a series of rolls having different rotation speeds. Preferred ranges of draw ratios so achieved are those previously specified.

The following examples are given for illustrating but not limiting purposes.

The following analytical methods are used to determine the properties reported in the description and in the examples.

Melt Flow Rate (MFR): ISO 1133 with a load of 2.16 kg at 230° C. for propylene polymers, or with a load of 2.16 kg at 190° C. for butene-1 polymers;

Flexural Modulus: ISO 178 on rectangular specimens 80×10×4 mm from T-bars ISO527-1 Type 1A;

Stress and Elongation at Break

Measured on precursor tapes according to ASTM D882-02, using a dynamometer INSTRON 4301, under the following conditions:
test temperature of 25° C.;
cross head speed of 500 mm/min., independently of the specimen elongation at break;
distance between clamps of 50 mm.

Comonomer(s) Content

Determined by IR spectroscopy or by $^{13}$C-NMR.

$^{13}$C-NMR measurements are performed on a polymer solution (8-12% by weight) in dideuterated 1,1,2,2-tetrachloroethane at 120° C. The $^{13}$C NMR spectra are acquired on a Bruker AV-600 spectrometer operating at 150.91 MHz in the Fourier transform mode at 120° C. using a 90° pulse, 15 seconds of delay between pulses and CPD (WALTZ16) to remove $^{1}$H-$^{13}$C coupling. About 1500 transients are stored in 32K data points using a spectral window of 60 ppm (0-60 ppm).

Copolymer Composition

Diad distribution is calculated from $^{13}$C NMR spectra using the following relations:

$$PP=100\, I_1/\Sigma$$

$$PB=100\, I_2/\Sigma$$

$$BB=100(I_3-I_{19})/\Sigma$$

$$PE=100(I_5+I_6)/\Sigma$$

$$BE=100(I_9+I_{10})/\Sigma$$

$$EE=100(0.5(I_{15}+I_6+I_{10})+0.25(I_{14}))/\Sigma$$

Where $\Sigma=I_1+I_2+I_3-I_{19}+I_5+I_6+I_9+I_{10}+0.5(I_{15}+I_6+I_{10})+0.25(I_{14})$ The molar content is obtained from diads using the following relations:

$$P(m\%)=PP+0.5(PE+PB)$$

$$B(m\%)=BB+0.5(BE+PB)$$

$$E(m\%)=EE+0.5(PE+BE)$$

$I_2$, $I_3$, $I_5$, $I_6$, $I_9$, $I_6$, $I_{10}$, $I_{14}$, $I_{15}$, $I_{19}$ are integrals of the peaks in the $^{13}$C NMR spectrum (peak of EEE sequence at 29.9 ppm as reference). The assignments of these peaks are made according to J. C. Randal, *Macromol. Chem Phys., C29*, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983).

They are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta} + 2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

Determination of Isotacticity Index (Solubility in Xylene at Room Temperature, in % by Weight) for Propylene Polymers 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Determination of Isotacticity Index (Solubility in Xylene at 0° C., in % by Weight) for Butene-1 Polymers 2.5 g of polymer are dissolved in 250 ml of xylene, at 135° C., under agitation. After 20 minutes, the solution is cooled to 0° C. under stirring, and then it is allowed to settle for 30 minutes. The precipitate is filtered with filter paper; the solution is evaporated under a nitrogen current, and the residue dried under vacuum at 140° C. until constant weight. The weight percentage of polymer soluble in xylene at 0° C. is then calculated. The percent by weight of polymer insoluble in xylene at room temperature is considered the isotactic index of the polymer.

Melting Temperature and Fusion Enthalpy

Determined by DSC according ISO 11357, part 3 with a heating rate of 20 K per minute.

Creep Resistance

Test specimens having length of 200 mm and width of 5 mm are cut from the precursor tapes. After conditioning for 7 days at 23° C., the specimens are subjected to traction with an applied stress of 70 MPa. A constant load traction apparatus is used; the distance between clamps is of 50 mm. The elongation after three increasing times is measured: the smaller the three elongation values and the difference among them, the higher is the creep resistance.

EXAMPLES 1 TO 3 AND COMPARISON EXAMPLE 1

Polymer compositions are prepared using the following materials as components A) and B).
Component A)
 PP: Propylene homopolymer with MFR of 2 g/10 min;
Component B)
 PB-1: butene-1 homopolymer having MFR of 0.4 g/10 min. and flexural modulus of 450 MPa.

The said components A) and B) are melt-blended in an extruder TR 14/24D USF B.V.O (MAC GI XIV), with screw diameter of 14 mm and screw length/diameter ratio of 24:1, under the following conditions:
 extrusion temperature of 210-220° C.;
 screw rotation speed of 60 rpm.

The so obtained composition is extruded in a Plasticizers MKII extruder equipped with a flat extrusion die, with die opening width and height of 80 mm and 250 μm respectively, thus obtaining a precursor tape.

The main extrusion conditions are:
Melt temperature of 250° C.;
Screw speed of 40 rpm;
Output of about 1 kg/hour.

After cooling at room temperature through chill rolls, the precursor tape is heated by feeding it through hot rolls having a temperature of about 70° C. and drawn by feeding it through rolls with different rotation speeds. A draw ratio of 4 is obtained.

The cutting treatment is not carried out, as it is not required for testing the final properties. Such cutting treatment is required in practice to obtain filaments having the desired width and consequently the desired titre, which in the present case could for instance range from 2 to 15 mm and from 300 to 2000 dTex respectively, but does not affect the tested properties.

The final properties of the so obtained precursor tape, measured after at least 7 days from extrusion, are reported in Table I, together with the relative amounts of the polyolefin components.

TABLE I

| Example No. | 1 | 2 | 3 | Comp. 1 |
|---|---|---|---|---|
| PP (wt %) | 20 | 50 | 80 | 100 |
| PB-1 (wt %) | 80 | 50 | 20 | |
| Properties | | | | |
| Tape thickness (μm) | 77 | 80 | 100 | 78 |
| Stress at break (MPa) | 202 | 144 | 137 | 114 |
| Elongation at break (%) | 52 | 85 | 63 | 62 |
| Elongation (%) | | | | |
| after 1 hour | 10 | 16 | 16 | 64 |
| after 3 hours | 10 | 19 | 22 | 100 |
| after 96 hours | 12 | 34 | 50 | 200 |

The invention claimed is:

1. A polymer filament comprising a polyolefin composition which comprises (percentages by weight)
    A) 5%-95% of a propylene homopolymer, wherein the propylene homopolymer has a melt flow rate from 0.5 to 10 g/10 min as measured at 230° C., 2.16 kg; and
    B) 5-95% of a butene-1 homopolymer or copolymer having a flexural modulus of 250 to 600 MPa, wherein the butene-1 copolymer contains up to 20 wt. % of a comonomer, based upon the total weight of the of the butene-1 copolymer,
    wherein the filament has a titre ranging from 20 to 1000 dTex.

2. The polymer filament of claim 1, in form of monofilament or tape.

3. The polymer filament of claim 1, having titre ranging from 100 to 1000 dTex.

4. The polymer filament of claim 1, stretched by drawing with a draw ratio from 1.5 to 10.

5. Manufactured items containing polymer filaments according to claim 1.

* * * * *